United States Patent
Song et al.

(10) Patent No.: US 11,900,619 B2
(45) Date of Patent: Feb. 13, 2024

(54) INTELLIGENT VEHICLE TRAJECTORY MEASUREMENT METHOD BASED ON BINOCULAR STEREO VISION SYSTEM

(71) Applicant: ZHONGYUAN UNIVERSITY OF TECHNOLOGY, Henan (CN)

(72) Inventors: Xiaowei Song, Zhengzhou (CN); Lei Yang, Zhengzhou (CN); Menglong Li, Zhengzhou (CN); Jianlei Xia, Zhengzhou (CN); Shan Li, Zhengzhou (CN); Yiping Chang, Zhengzhou (CN)

( * ) Notice: Subject to any disclaimer, the term of this patent is extended or adjusted under 35 U.S.C. 154(b) by 196 days.

(21) Appl. No.: 17/422,446

(22) PCT Filed: Jun. 29, 2020

(86) PCT No.: PCT/CN2020/098769
§ 371 (c)(1),
(2) Date: Jul. 12, 2021

(87) PCT Pub. No.: WO2021/004312
PCT Pub. Date: Jan. 14, 2021

(65) Prior Publication Data
US 2022/0092797 A1   Mar. 24, 2022

(30) Foreign Application Priority Data

Jul. 8, 2019   (CN) .......................... 201910608892.6

(51) Int. Cl.
*G06T 7/62* (2017.01)
*G06T 7/80* (2017.01)
(Continued)

(52) U.S. Cl.
CPC ............ *G06T 7/285* (2017.01); *G06F 18/213* (2023.01); *G06N 3/04* (2013.01); *G06N 3/08* (2013.01);
(Continued)

(58) Field of Classification Search
CPC .............................. G06T 7/285; H04N 13/246
See application file for complete search history.

(56) References Cited

U.S. PATENT DOCUMENTS

2011/0134221 A1* 6/2011 Lee .................... G06T 7/593
348/46
2016/0232410 A1* 8/2016 Kelly .................. G06V 30/224
(Continued)

OTHER PUBLICATIONS

Zhang Z. A flexible new technique for camera calibration. IEEE Transactions on pattern analysis and machine intelligence. Nov. 2000;22(11):1330-4. (Year: 2000).*
(Continued)

*Primary Examiner* — Clifford Hilaire
(74) *Attorney, Agent, or Firm* — Novoclaims Patent Services LLC; Mei Lin Wong

(57) ABSTRACT

The invention provides a method for intelligently measuring vehicle trajectory based on a binocular stereo vision system, including the following steps: inputting a dataset into an SSD (Single Shot Multibox Detector) neural network to train a license plate recognition model; calibrating the binocular stereo vision system, and recording videos of moving target vehicles; detecting the license plates in the video frames with the license plate recognition model; performing stereo matching on the license plates in the subsequent frames of the same camera and in the corresponding left-view and right-view video frames by a feature-based matching algorithm; reserving correct matching point pairs after filtering with a homography matrix; screening the reserved matching point pairs, and reserving the one closest to the license plate center as the position of the target vehicle in the current frame; performing stereo measurement on the screened and reserved matching point pairs to get the spatial position coordinates of the vehicle in the video frames; and generating the moving trajectory of the vehicle in time
(Continued)

sequence. The present invention is easy to install and adjust, and can simultaneously measure multiple target vehicles in multiple directions and on multiple lanes.

12 Claims, 9 Drawing Sheets

(51) Int. Cl.
| | |
|---|---|
| G06T 7/73 | (2017.01) |
| G06T 7/593 | (2017.01) |
| H04N 13/246 | (2018.01) |
| H04N 13/239 | (2018.01) |
| G06V 20/54 | (2022.01) |
| G06V 10/44 | (2022.01) |
| G06V 10/82 | (2022.01) |
| G06V 20/40 | (2022.01) |
| G06V 10/75 | (2022.01) |
| G06N 3/04 | (2023.01) |
| G06N 3/08 | (2023.01) |
| G08G 1/017 | (2006.01) |
| G08G 1/056 | (2006.01) |
| G06F 18/213 | (2023.01) |
| H04N 23/60 | (2023.01) |
| G06T 7/285 | (2017.01) |

(52) U.S. Cl.
CPC ............... *G06T 7/593* (2017.01); *G06T 7/62* (2017.01); *G06T 7/75* (2017.01); *G06T 7/85* (2017.01); *G06V 10/449* (2022.01); *G06V 10/757* (2022.01); *G06V 10/82* (2022.01); *G06V 20/41* (2022.01); *G06V 20/54* (2022.01); *G08G 1/0175* (2013.01); *G08G 1/056* (2013.01); *H04N 13/239* (2018.05); *H04N 13/246* (2018.05); *H04N 23/64* (2023.01); *G06T 2207/10021* (2013.01); *G06T 2207/20081* (2013.01); *G06T 2207/20084* (2013.01); *G06T 2207/30241* (2013.01); *G06T 2207/30244* (2013.01)

(56) References Cited

U.S. PATENT DOCUMENTS

2018/0211117 A1* 7/2018 Ratti .................... G06V 10/764
2018/0300900 A1* 10/2018 Wakai ...................... G06T 7/73

OTHER PUBLICATIONS

Xu G, Zhang Z. Epipolar geometry in stereo, motion and object recognition: a unified approach. Springer Science & Business Media; Sep. 30, 1996. (Year: 1996).*

Zhao Z, Liu Y, Zhang Z. Camera calibration with three noncollinear points under special motions. IEEE transactions on image processing. Nov. 11, 2008;17(12):2393-402. (Year: 2008).*

Zhang Z, Luong QT, Faugeras O. Motion of an uncalibrated stereo rig: Self-calibration and metric reconstruction. IEEE Transactions on Robotics and Automation. Feb. 1996;12(1):103-13. (Year: 1996).*

* cited by examiner (a)            (b)

(c)

(a)      (b)

(a)      (b)

(a)        (b)

(a)        (b)

(a1)      (a2)      (a3)

(b1)      (b2)      (b3)

(a)          (b)

(a)          (b)

(a)          (b)

(c)          (d)

(a)          (b)

INTELLIGENT VEHICLE TRAJECTORY MEASUREMENT METHOD BASED ON BINOCULAR STEREO VISION SYSTEM

CROSS REFERENCE OF RELATED APPLICATION

This is a non-provisional application that claims priority to international application number PCT/CN2020/098769, international filing date Jun. 29, 2020, which claims priority to Chinese Patent Application, application number CN 201910608892.6, filed Jul. 8, 2019, the entire contents of each of which are expressly incorporated herein by reference.

BACKGROUND OF THE PRESENT INVENTION

Field of Invention

The present invention relates to the technical field of binocular stereo visions, and more particularly to a method for intelligently measuring vehicle trajectory based on a binocular stereo vision system.

Description of Related Arts

A conventional traffic monitoring system generally takes pictures of a road by means of a photographing device installed above or on one side of the road, and then detects an overspeed behavior and takes a picture as an evidence by means of a pre-embedded coil, a radar, or a laser radar and the like. The conventional traffic monitoring system requires multiple systems to work together to complete the operations of speed measurement, license plate recognition, evidence collection and recording. The installation, placing and adjusting operations are relatively complex. Other illegal driving behaviors, such as answering a phone while driving, not fastening a seatbelt and the like, are generally detected by manually viewing a video or image record. However, the manual traffic offence detection mode obviously cannot satisfy the requirement for traffic monitoring development with more and more vehicles in the future. The construction of intelligent transportation is urgent.

A binocular stereo vision system is a classic vision system in the field of machine visions. The system acquires a pair of video images having a certain parallax with two cameras, and can obtain some states of an object in the real 3D space by calculating the difference between the two images. The common speed measurement methods, such as radar, laser radar and the like, need to destroy the road to bury coils, cannot measure all the vehicle targets in sight, cannot measure the vehicle trajectory, the lane changing situation, the steering state and the like on a rough or turning section, and therefore has a small application range.

SUMMARY OF THE PRESENT INVENTION

To solve the technical problems that the existing vehicle trajectory measurement method needs to destroy the road and has a small application range, the present invention provides a method for intelligently measuring vehicle trajectory based on a binocular stereo vision system. The method of the present invention measures the trajectory by the binocular stereo vision system, has detection secrecy, does not need to destroy the road to bury coils, can simultaneously measure all the vehicle targets in sight, and can measure the vehicle trajectory, the lane changing situation, the steering state and the like on a rough or turning section.

In order to achieve the above-mentioned purpose, the present invention adopts the following technical solution: a method for intelligently measuring vehicle trajectory based on a binocular stereo vision system, including:

step 1, inputting a dataset of images containing license plates into an SSD neural network, and training the SSD neural network with license plate as the detection feature to obtain a license plate recognition model;

step 2, installing the binocular stereo vision system on the right side, middle or above a lane, calibrating the binocular stereo vision system to acquire the internal and external parameters of two cameras; and recording videos of moving target vehicles by the calibrated binocular stereo vision system;

step 3, detecting the license plates in the video frames recorded in step 2 with the license plate recognition model trained in step 1, and locating the license plate positions of the target vehicles;

step 4, performing feature point extraction and stereo matching on the license plates in the subsequent frames of the same camera by a feature-based matching algorithm, and reserving correct matching points after filtering with a homography matrix; performing feature point extraction and stereo matching on the license plates in the corresponding left-view and right-view video frames of the binocular stereo vision system by a feature-based matching algorithm, and reserving correct matching points after filtering with a homography matrix;

step 5, screening the reserved matching point pairs in step 4, then eliminating the screened matching points by the distance measurement method of the binocular stereo vision system, and reserving the one closest to the license plate center as the position of the target vehicle in the current frame; and step 6, performing stereo measurement on the screened matching points by the binocular stereo vision system to get the spatial position coordinates of the vehicle in the video frames; and generating a moving trajectory of the vehicle in time sequence.

The SSD neural network in step 1 is formed on the basis of a classical SSD neural network by removing the convolutional layer conv11_2 and reserving the features of the convolutional layers conv4_3, conv_7, conv8_2, conv9_2 and conv10_2. The feature information in different scales extracted by the convolutional layers conv4_3, conv7, conv8_2, conv9_2, and conv10_2 is fused and input into a classifier. The position of the license plate is predicted according to the feature maps output by the convolutional layers.

The datasets in step 1 includes the BIT-Vehicle dataset provided by Beijing Institute of Technology, the open license plate database provided by OpenITS research plan sponsored by Guangdong Key Laboratory of Intelligent Transportation Systems (ITS), and 1000 self-shot vehicle license plate images, with a total of 11000 images.

The binocular stereo vision system includes two cameras and a host computer. The two cameras are flea2 industrial cameras, one for the left-view camera and the other for the right-view camera, and both are connected with the host computer.

The calibration method for the binocular stereo vision system in the step 2 includes: calibrating the two cameras with Zhengyou Zhang's calibration method to acquire their respective parameters such as coordinates of optical center, focal length, scale factor and/or lens distortion; after acquiring the parameters of the two cameras, calibrating the binocular stereo vision system with Zhengyou Zhang's calibration method again to acquire the displacement and rotation angle of the right-view camera relative to the left-view camera (taking the left-view camera as the reference).

The 3D measurement principle of the binocular stereo vision system is: taking the left-view camera as the reference, calibrating with Zhengyou Zhang's calibration method to acquire the external parameters (relative translation vector $T1=(l,m,n)^T$ and relative rotation vector $V=(\alpha,\beta,\gamma)^T$)) of the right-view camera and the internal parameters (focal length, optical-axis angle, and distortion) of the two cameras themselves, wherein, l,m,n respectively refer to the displacements of the right-view camera relative to the left-view camera in the three directions of x, y and z; $\alpha,\beta,\gamma$ respectively refer to the rotation angles of the right-view camera relative to the left-view camera around the three axes of x, y and z.

The convergence point of the binocular stereo vision system is determined according to the external parameters:

$$\begin{cases} B = \sqrt{l^2 + m^2 + n^2} \\ \varepsilon = \beta \end{cases};$$

wherein, B is a baseline length between the two cameras, and c indicates the angle between the optical axes of the two cameras.

The transformation model is established for the target angle. The imaging points of the same space point in the two cameras are respectively called the left corresponding point and the right corresponding point, which are intersections of the left-view camera and the right-view camera's optical axes and their respective imaging planes. a' represents the difference between the left corresponding point and the convergence point in the u direction of the image coordinate system, and b' represents the difference between the right corresponding point and the convergence point in the u direction of the image coordinate system. If the left corresponding point or the right corresponding point is on the left side of the convergence point, the difference value is less than 0, otherwise the difference is greater than 0.

The optical axes are perpendicular to their respective imaging planes. The line connecting the optical center to the target point is called the corresponding axis. The angles a and b between the corresponding axes and the optical axes can be calculated as:

$$\begin{cases} a = \arctan(a'/f_l) \\ b = \arctan(b'/f_r) \end{cases};$$

wherein $f_l$ and $f_r$ respectively indicate the focal lengths of the left-view camera and the right-view camera.

When the target point is in region I, the target angle c can be calculated as:

$$\begin{cases} c = \varepsilon + |b| - |a| = \varepsilon - b + a \\ a < 0, b < 0 \& \varepsilon > 0 \end{cases};$$

Assuming the world coordinates of the target point P in region I are (x, y, z), a depth calculation model for the target point P can be established as:

$$\tan a = \frac{x}{z};$$

$$\tan(c - a) = \frac{l + x}{z - n}, a < 0$$

then $$z = \frac{n\tan(\varepsilon - b) + l}{\tan(\varepsilon - b) + \tan a};$$

The world coordinate x can be calculated with the depth calculation model for the target point P as:

$$x = \frac{n\tan(\varepsilon - b) + l}{\tan(\varepsilon - b) + \tan a}\tan a;$$

similarly, the world coordinates z can be calculated as:

$$z = \frac{n\tan(\varepsilon - b) + l}{\tan(\varepsilon - b) + \tan a};$$

The world coordinate y can be calculated according to the relation between the left corresponding point and the right corresponding point in the image coordinate system and the relation between the image coordinate system and the world coordinate system. The world coordinates of the target point P are:

$$\begin{cases} x = \frac{n\tan(\varepsilon - b) + l}{\tan(\varepsilon - b) + \tan a}\tan a \\ y = \frac{n\tan(\varepsilon - b) + l}{\tan(\varepsilon - b) + \tan a} \cdot \frac{v'}{f_l} \\ z = \frac{n\tan(\varepsilon - b) + l}{\tan(\varepsilon - b) + \tan a} \end{cases};$$

wherein, v' indicates the pixel difference between the target point and the image center in the longitudinal direction of the image coordinate system, and $f_l$ is the focal length of the left-view camera. Similarly, the world coordinates of the target point in region II, region III and region IV can be calculated.

The feature-based matching algorithm is a SURF feature extracting and matching algorithm. The local features of the video frames are described by the SURF descriptors. The homography matrix describes the relationship between two images of the same object taken in the different views. Assuming that the relationship of the two images is perspective transformation, then the homography matrix H is:

$$H = \begin{bmatrix} h_{11} & h_{12} & h_{13} \\ h_{21} & h_{22} & h_{23} \\ h_{31} & h_{32} & 1 \end{bmatrix};$$

then

-continued $$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix};$$

wherein x¢, y¢, 1 and x, y, 1 respectively represent the coordinates of the two corresponding points before and after the perspective transformation, and $h_{11\text{-}32}$ are transformation parameters to be calculated.

To calculate the eight transformation parameters $h_{11\text{-}32}$ in the homography matrix H, at least four pairs of matching points are needed. The process is as follows:

$$\begin{bmatrix} x_1, y_1, 1, 0, 0, 0, -x'_1 x_1, -x'_1 y_1 \\ 0, 0, 0, x_1, y_1, 1, -y'_1 x_1, -y'_1 y_1 \\ x_2, y_2, 1, 0, 0, 0, -x'_2 x_2, -x'_2 y_2 \\ 0, 0, 0, x_2, y_2, 1, -y'_2 x_2, -y'_2 y_2 \\ x_3, y_3, 1, 0, 0, 0, -x'_3 x_3, -x'_3 y_3 \\ 0, 0, 0, x_3, y_3, 1, -y'_3 x_3, -y'_3 y_3 \\ x_4, y_4, 1, 0, 0, 0, -x'_4 x_4, -x'_4 y_4 \\ 0, 0, 0, x_4, y_4, 1, -y'_4 x_4, -y'_4 y_4 \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x'_1 \\ y'_1 \\ x'_2 \\ y'_2 \\ x'_3 \\ y'_3 \\ x'_4 \\ y'_4 \end{bmatrix};$$

Each time, four pairs of matching points are selected from all the matching points to calculate the homography matrix H; then the homography matrix with the maximum number of accurate matching points is selected as the most accurate homography matrix H. In order to check the accuracy of the matrix H, the Euclidean distance between the corresponding matching points is calculated:

$$\left\| \begin{bmatrix} x'_{i1} \\ y'_{i1} \\ 1 \end{bmatrix} - H \begin{bmatrix} x_{i1} \\ y_{i1} \\ 1 \end{bmatrix} \right\| \leq t;$$

wherein $x_{i1}'$, $y_{i1}'$, 1 and $x_{i1}$, $y_{i1}$, 1 respectively represent the coordinates of the matching points before and after the perspective transformation, t is the Euclidean distance threshold, and i1=1,2,3,4. The smaller the Euclidean distance, the higher the matching accuracy of the two corresponding matching points.

The screening method in step 5 includes: in the left-view video frame, drawing a circle in a license plate area by taking the center point of the area as the circle center and the height of the area as the diameter; in the corresponding right-view video frame, drawing an isometric circle by taking the center of the matching area as the circle center; and eliminating the matching points not simultaneously contained in the two circles.

The distance measurement method of the binocular stereo vision system in step 5 includes: calculating the distance $d_i$ of all the N matching points respectively; calculating the mean value μ and the standard deviation σ of $d_i$; calculating the Z score $Z_i$ for each matching point:

$$\mu = \frac{\sum_{i=1}^{N} d_i}{N}$$

$$\sigma = \sqrt{\frac{1}{N} \sum_{i=1}^{N} (d_i - \mu)^2}$$

$$Z_i = \frac{(d_i - \mu)}{\sigma}$$

eliminating m1 matching points with the absolute values of Z score $|Z_i|>1$; choosing the matching point i closest to the center of the license plate from the remaining N−m1 matching points; and taking its coordinates as the position $P_i$ of the target vehicle in the current frame.

In step 6, stereo measurement is performed on the screened matching points by the binocular stereo vision system to get the positions $P_1=(x_1, y_1, z_1)$ and $P_2=(x_2, y_2, z_2)$ of the target vehicle at the time $t_1$ and $t_2$, and so on; the moving trajectory and steering information of the vehicle can be obtained in time sequence. The moving direction vector of the vehicle between two points can be calculated according to the difference between the coordinates of the two points:

α1=((x_2−x_1),(y_2−y_1),(z_2−z_1))

The 3D moving trajectory of the vehicle is projected onto an XOY plane to obtain a vector relationship:

$$x_1 \cdot y_2 - x_2 \cdot y_1 = \sqrt{x_1^2 + y_1^2} \cdot \sqrt{x_2^2 + y_2^2} * \sin\varepsilon 1$$

$$\varepsilon 1 = \arcsin \frac{x_1 g y_2 - x_2 g y_1}{\sqrt{x_1^2 + y_1^2} g \sqrt{x_2^2 + y_2^2}};$$

wherein $\varepsilon_1$ is the steering angle of the vehicle. $\varepsilon_1=0$ indicates that the vehicle does not turn; $\varepsilon_1>0$ indicates that the vehicle turns left; and $\varepsilon_1<0$ indicates that the vehicle turns right.

The beneficial effects of the present invention: the present invention utilizes the binocular stereo vision system as a vehicle video acquisition device, utilizes the trained SSD neural network to automatically recognize and locate a vehicle, performs tracking and stereo matching on the same target in a binocular stereo video by image matching algorithm, finally utilizes the binocular stereo vision system to detect the spatial position of the vehicle and generates a moving trajectory in time sequence. The binocular stereo vision system is easy to install and adjust, can simultaneously and automatically recognize multiple trained features, and can better satisfy the development requirement for the intelligent transportation network and the Internet of Things in the future.

BRIEF DESCRIPTION OF THE DRAWINGS

In order to describe the technical solutions in the embodiments of the present invention or in the prior art more clearly, the drawings to be used in the description of the embodiments or the prior art will be briefly introduced hereafter. It would be obvious that the drawings described below are only some embodiments of the present invention, and a person skilled in the art could obtain other drawings according to these accompanying drawings without involving an inventive effort.

DETAILED DESCRIPTION OF THE PREFERRED EMBODIMENT

The technical solutions in the embodiments of the present invention will be clearly and completely described hereafter in combination with the drawings in the embodiments of the present invention. It is apparent that the described embodiments are only a part of the embodiments of the present invention, but not the whole. On the basis of the embodiments in the present invention, all the other embodiments obtained by a person skilled in the art without involving an inventive effort are all concluded in the protection scope of the present invention.

Figure 1:
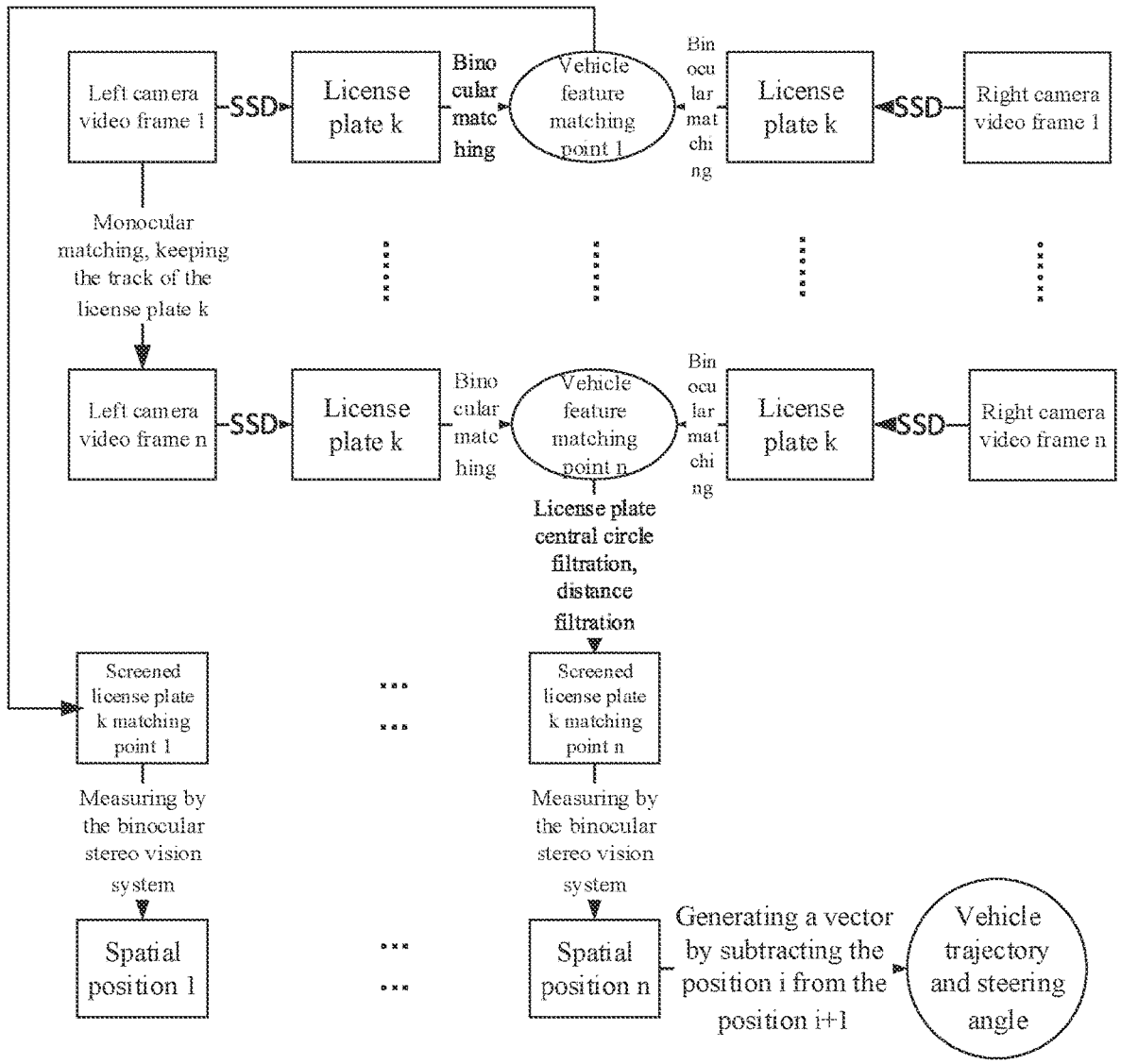
FIG. 1 is a flow chart of the present invention.
Figure 2:
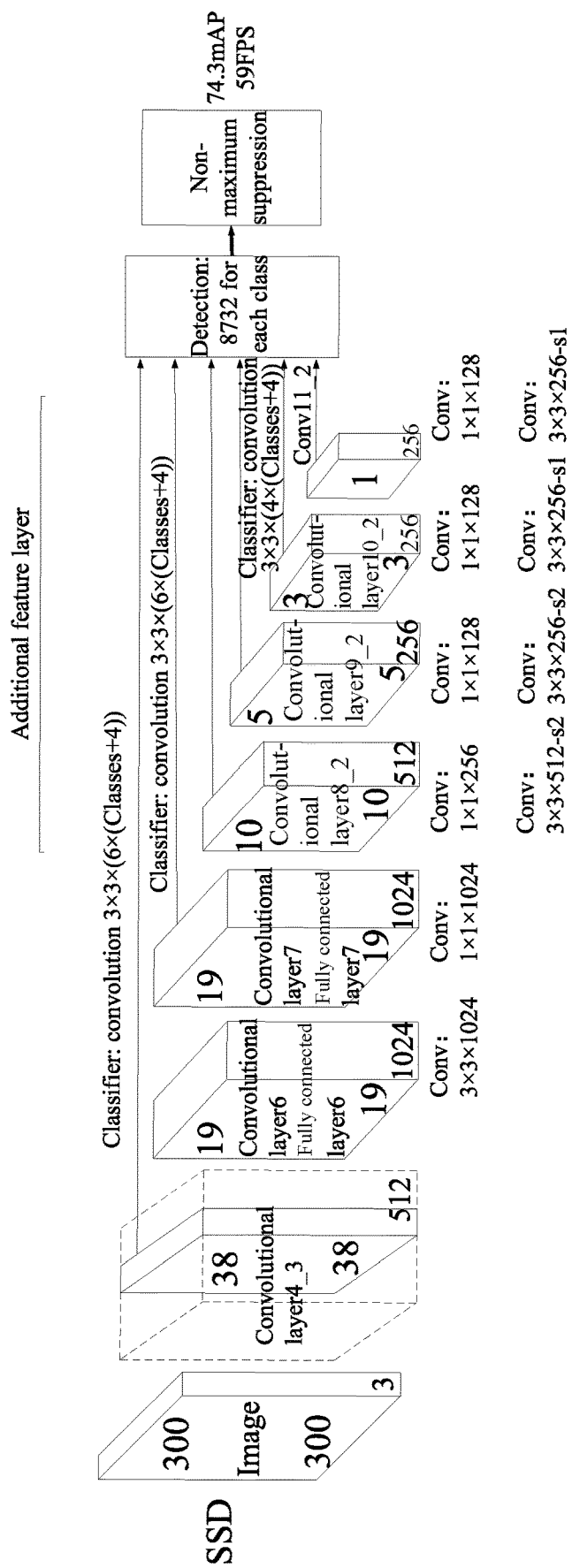
FIG. 2 is a structural diagram of the SSD neural network.

As shown in FIG. 1, a method for intelligently measuring vehicle trajectory based on a binocular stereo vision system, including the following steps:

Step 1: inputting images containing license plates in an open traffic monitoring video into an SSD neural network, and training the SSD neural network with the license plate as the detection feature to obtain a license plate recognition model.

To detect the moving state of a vehicle in the traffic video recorded by the binocular stereo vision system, first the position of the vehicle should be accurately detected. In order to meet the development requirement of the intelligent transportation network and relieve the pressure caused by the more and more traffic video data, the SSD neural network with high precision and quick detection speed is selected to automatically detect and locate the vehicle target in the video for the particular traffic video monitoring scenario. A license plate recognition model based on SSD neural network algorithm is trained to be ready for use. Here, the license plate of the vehicle is chosen as the target to be detected because of its standard style, uniform and relatively small size, rich textures and regular shape, which can improve the accuracy of the position detection and facilitate the acquisition of the matching point position to perform 3D measurement. Different from the conventional image processing-based license plate detection methods, the present invention not only can take the license plate as the detection feature, but also can use other features such as auto logo, wheel, window, backup mirror and the like to further improve the detection accuracy. Moreover, those features can be used to recognize illegal vehicles in the subsequent applications.

According to the statistical distribution of the vehicle size in the road surveillance video, the detection network used in the present invention is improved on the basis of the classic SSD neural network, removing the convolutional layer conv11_2 and reserving the convolutional layers conv4_3, conv_7, conv8_2, conv9_2 and conv10_2. The feature information in different scales extracted by the convolutional layers is fused and input into a classifier. The position of the license plate is predicted according to the feature maps output by the convolutional layers.

The present invention utilizes multiple datasets to train the neural network. The datasets used for neural network training and detection include the BIT-Vehicle dataset provided by Beijing Institute of Technology, the open license plate database (http://www.openits.cn/) provided by the OpenITS research project sponsored by Guangdong Key Laboratory of Intelligent Transportation Systems, and 1000 images taken by the team of the present invention. The SSD neural network is trained by a total of 11000 images to automatically recognize and locate the license plate in the traffic surveillance video. The license plate recognition model trained by the SSD neural network can accurately recognize the license plate in each frame of the video.

Step 2: installing the binocular stereo vision system on the right side, middle or above a lane, calibrating the binocular stereo vision system to acquire the internal and external parameters of the two cameras, and recording videos of moving target vehicles by the calibrated binocular stereo vision system.

Two flea2 industrial cameras made by POINT GRAY company and a laptop are used to establish the binocular stereo vision system. As a measurement platform, the two cameras synchronously shoot a measurement region, and communicate with the laptop via a USB cable. The laptop is equipped with an Intel Core i7 CPU, an 8G memory, a NVIDIA GeForce 830M discrete graphics card, and a solid-state disk. The binocular stereo vision system is installed on the right side, middle or above a lane, so that the two cameras can both shoot the vehicle license plate (either front or back). Afterwards, the two cameras of the binocular stereo vision system are calibrated to acquire the internal and external parameters of the binocular cameras. The present invention calibrates the binocular cameras with Zhengyou Zhang's calibration method to acquire their respective parameters such as coordinates of optical center, focal length, scale factor, lens distortion and the like. After acquiring the internal parameters, the binocular stereo vision system is calibrated with Zhengyou Zhang's calibration method again. In the present experiment, taking the left-view camera as the reference, the displacement and rotation angle of the right-view camera relative to the left-view camera are acquired by calibration.

Figure 3:
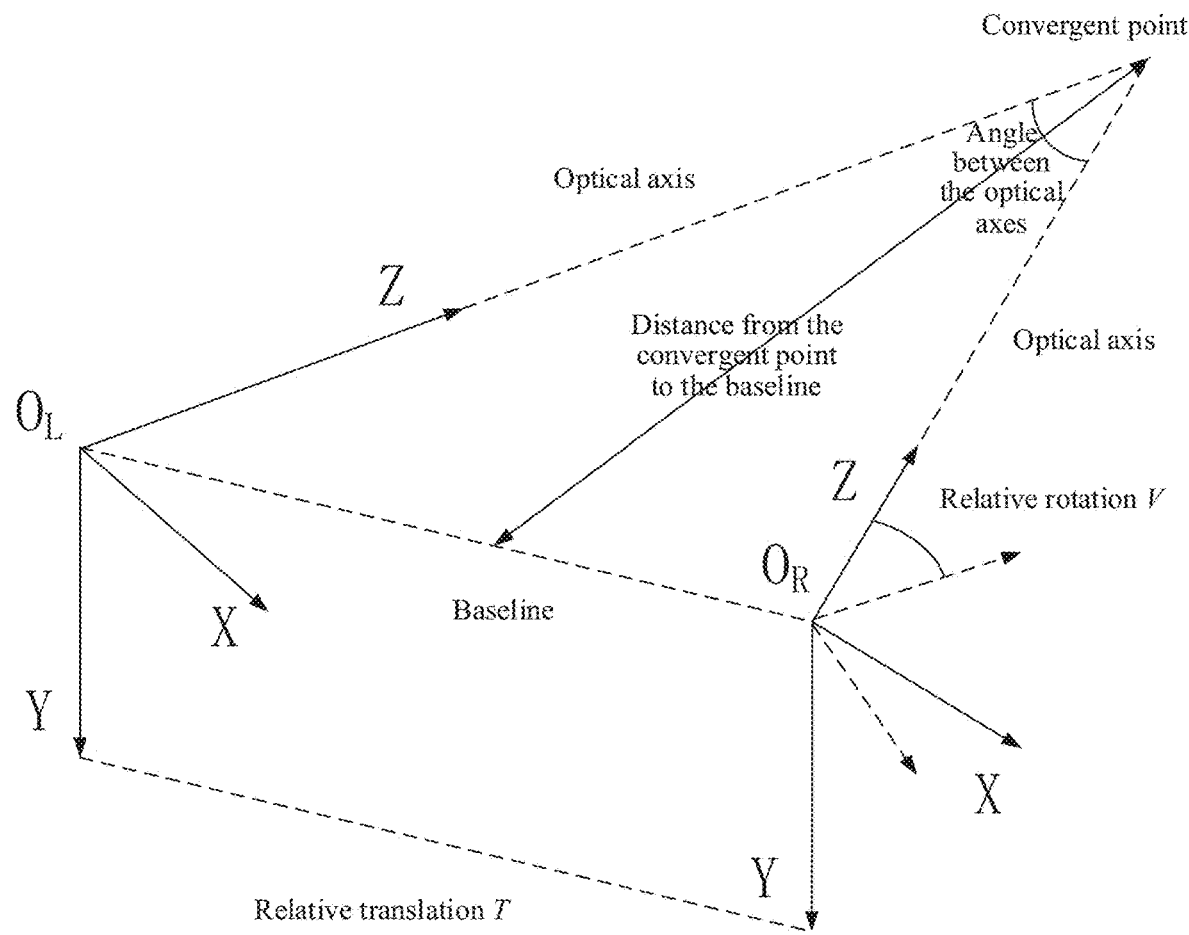
FIG. 3 is a structural schematic view of the convergent binocular stereo vision system.

In practical measurement, each time the camera position is changed, the camera system needs to be calibrated to ensure the measurement accuracy. After acquiring the internal and external parameters of the camera system, the binocular stereo vision system is utilized to measure distance, trajectory and the like. The calibrated binocular stereo vision system shoots the moving vehicle. The shooting regions of the left-view and right-view cameras are different, and the shooting angles are slightly different. Therefore, the two images have a certain parallax. The images are processed by utilizing the 3D measurement principle of the binocular stereo vision system. In the principle, the left-view camera is taken as the reference. After calibration with Zhengyou Zhang's calibration method, the external parameters (relative translation vector $T1=(l,m,n)^T$ and relative rotation vector $V=(\alpha,\beta,\gamma)^T$) of the right-view camera and the internal parameters (focal length, optical-axis angle and distortion) of the two cameras in the binocular stereo vision system can be acquired, wherein, l,m,n refer to the displacements of the right-view camera relative to the left-view camera in the three directions of x, y and z respectively, $\alpha,\beta,\gamma$ refer to the rotation angles of the right-view camera relative to the left-view camera around the three axes of x, y and z respectively. Then, the baseline length B, namely the space between the two cameras, the angle c between the optical axes of the two cameras the external parameters of the two cameras, and the convergent point of the binocular stereo vision system can be acquired, as shown in FIG. 3.

The convergence point of the binocular stereo vision system is determined according to the external parameters:

$$\begin{cases} B = \sqrt{l^2 + m^2 + n^2} \\ \varepsilon = \beta \end{cases} \quad (1)$$

Figure 4:
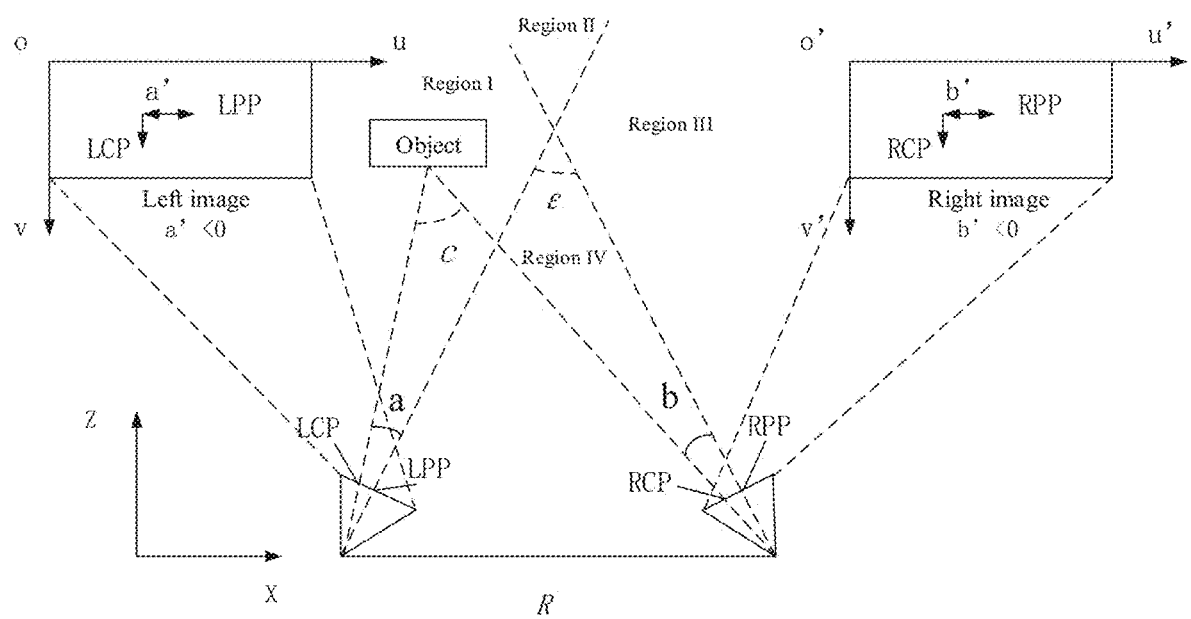
FIG. 4 is a schematic view of the target angle transformation model.

After the baseline length and the transformation angle are acquired, the target angle c and the depth information of the object can be calculated. A target angle transformation model is as shown in FIG. 4. The imaging points of the same space point in the two cameras are respectively called the left corresponding point (LCP) and the right corresponding point (RCP). The LPP and the RPP are respectively intersections of the left-view camera and the right-view camera's optical axes and their respective imaging planes. $\alpha'$ represents the pixel difference between the left corresponding point and the primary point (the convergence point) in the u direction, and b' represents the pixel difference between the right corresponding point and the primary point (the convergence point) in the u direction. If the corresponding point is on the left side of the primary point, the difference is less than 0, otherwise the difference is greater than 0. When the target is located in the region 1, a' and b' are less than 0. The optical axes are perpendicular to their respective imaging planes. The line connecting the optical center to the target point is called the corresponding axis. The angles a and b between the corresponding axes and the optical axes can be calculated as:

$$\begin{cases} a = \arctan(a' / f_l) \\ b = \arctan(b' / f_r) \end{cases} \quad (2)$$

wherein, $f_l$ and $f_r$ indicate the focal lengths of the two cameras respectively. When the target is in region I, the target angle c can be calculated as:

$$\begin{cases} c = \varepsilon + |b| - |a| = \varepsilon - b + a \\ a < 0, \ b < 0 \ \& \ \varepsilon > 0 \end{cases} \quad (3)$$

Figure 5:
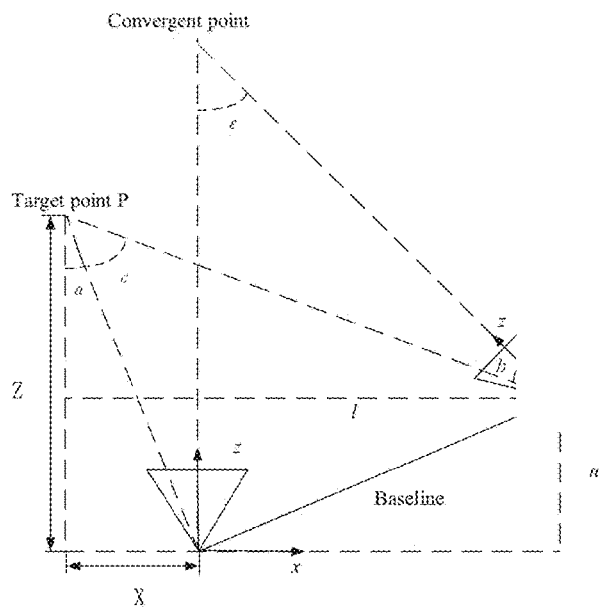
FIG. 5 is a schematic view of the target point depth calculation model.

In the other three regions, the target angles can be deducted similarly. In region II, a'<0,b'>0. In region III, a'>0,b'>0. In region IV, a'>0,b'<0. The depth calculation model of the target point P is shown in FIG. 5. Assuming that the target point P is in region I and the world coordinates of P are (x, y, z), then:

$$\tan a = \frac{x}{z} \quad (4)$$

In FIG. 5, a is a negative value.

$$\tan(c - a) = \frac{l + x}{z - n}, \ a < 0 \quad (5)$$

then $$z = \frac{n\tan(\varepsilon - b) + l}{\tan(\varepsilon - b) + \tan a} \quad (6)$$

Figure 6:
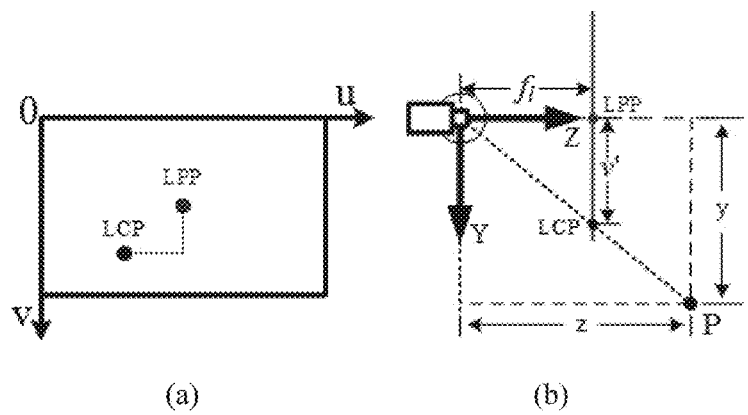
FIG. 6 is a schematic view of the value y calculation method, wherein (a) indicates the position of the target point relative to the center point on the imaging plane, and (b) indicates the position of the target point relative to the optical axis of the camera in the real space.

The world coordinate x can be calculated as above. The projective point of a target point projected to the left camera according to a mapping relationship is called the left corresponding point (LCP); and the left primary point (LPP) is the intersection point between the optical axis of the left camera and a 2D imaging plane. As shown in FIG. 6, in the coordinate system of the left image, the pixel difference between LCP and LPP in the direction (the longitudinal direction of the image coordinate system) is v' and $f_l$ is the focal length of the left camera. Then:

$$\frac{y}{z} = \frac{v'}{f_l}$$

In summary, the world coordinates of the target point P can be calculated as:

$$\begin{cases} x = \dfrac{n\tan(\varepsilon - b) + l}{\tan(\varepsilon - b) + \tan a}\tan a \\ y = \dfrac{n\tan(\varepsilon - b) + l}{\tan(\varepsilon - b) + \tan a} \cdot \dfrac{v'}{f_v} \\ z = \dfrac{n\tan(\varepsilon - b) + l}{\tan(\varepsilon - b) + \tan a} \end{cases} \quad (7)$$

Similarly, the world coordinates of the target point in region II, region III and region IV can be calculated. Please refer to the patent CN107705331 A, A Vehicle Video Speed Measurement Method based on Multi-View Camera for specific details. The distance from the target point to the camera (i.e., the center of the left camera sensor) can be calculated by $D = \sqrt{x^2 + y^2 + z^2}$.

Step 3: detecting license plates in video frames recorded by the calibrated binocular stereo vision system with the license plate recognition model trained in step 1, and locating the license plate positions of the target vehicles.

The license plate is extracted with an SSD neural network algorithm and a target frame with a regular contour is marked, in which a quick processing speed is provided while guaranteeing the detection accuracy; and the requirements for quickly detecting and locating a target in a video can be satisfied. The model trained in step 1 is utilized to perform target detection on the video frame acquired by the camera calibrated in step 2, so as to locate the license plate. Theoretically, it is unnecessary to perform accurate target detection in the measurement region of every frame; the vehicle trajectory and the steering state can be detected only by accurately detecting more than two pairs of frames.

Step 4: performing feature point extraction and matching on the license plates in the subsequent frames of the same camera by a feature-based matching algorithm, and filtering the matching points with a homography matrix to ensure correct vehicle tracking; performing feature point extraction and stereo matching on the license plates in the corresponding left-view and right-view video frames of the binocular stereo vision system by a feature-based matching algorithm, and reserving correct matching points for stereo measurement after filtering with the homography matrix.

In order to acquire accurate 3D information in the subsequent binocular video detection, the feature points of the corresponding video images acquired by the left-view and right-view cameras need to be extracted and matched. It should be noted that each target should be correctly tracked if multiple targets exist in the video. Therefore, the same target in each frame of the same video should also be matched, and then 3D information detection is performed on the matching points of corresponding frames in the video recorded by the left and right cameras at the same time.

The 2D image matching algorithm used in the present invention is a feature based matching algorithm. Feature descriptors are generated according to image features such as point, line (edge), and plane features; then similarity between the descriptors are compared to match between corresponding features of two video images. Plane feature is difficult to extract due to large amount of calculation and time consumption. SURF feature is used in the present invention to perform video image feature extraction and matching. A SURF descriptor describes the local feature of the video image. When the video image is rotated, translated or scale zoomed, the SURF feature extraction and matching algorithm has good stability.

Figure 7:
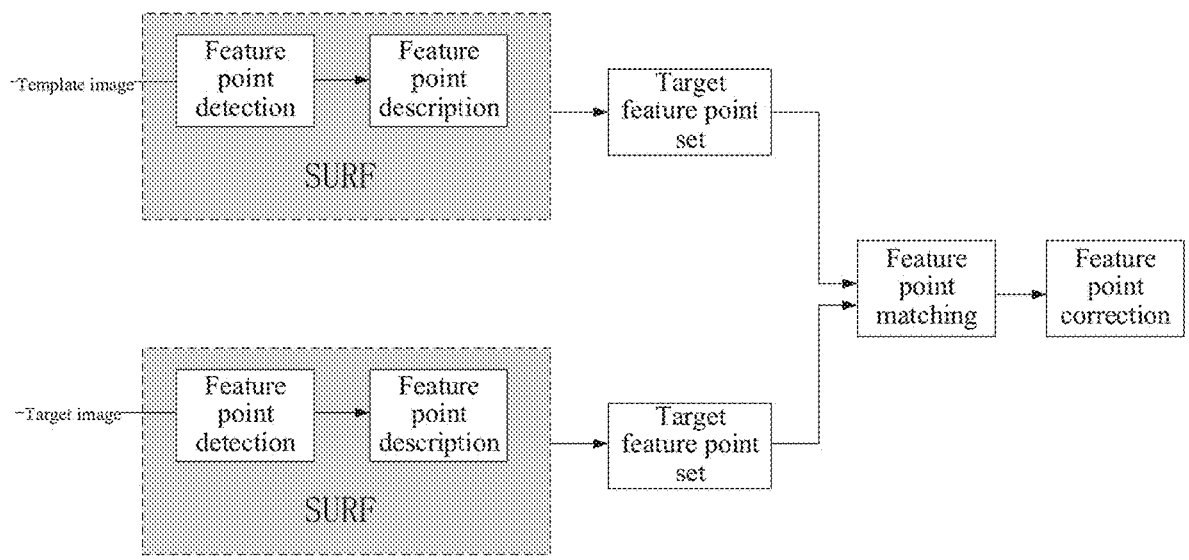
FIG. 7 is a flow chart of the SURF feature extraction and matching algorithm.

As shown in FIG. 7, the SURF feature extraction and matching algorithm mainly includes: 1, extracting key points not influenced by light change, for example, an angle point, an edge point, a bright point in a dark region, and a dark point in a bright region; 2, extracting the detailed local feature vector for these key points; and 3, pairwise comparing the feature vectors of the template image and the target image, and finding the best matching point pairs to achieve the matching between the two images.

Figure 8:
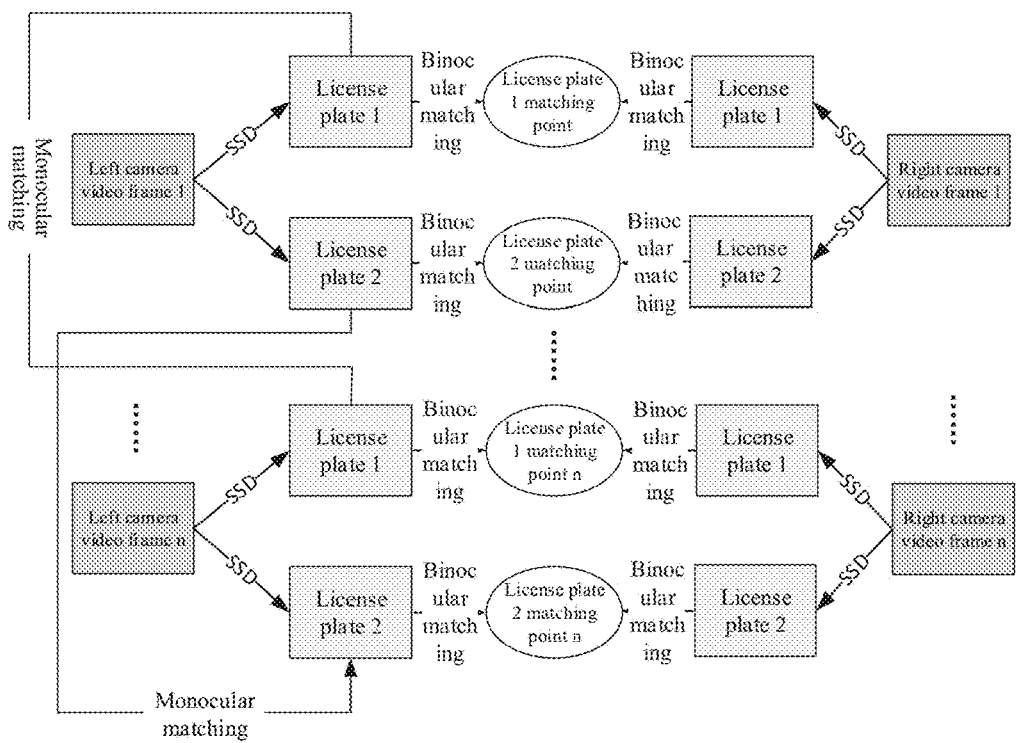
FIG. 8 is a flow chart of monocular video frame feature point matching and binocular stereo matching.

As shown in FIG. 8, the license plates detected in a single view video are matched by the SURF algorithm to independently track the plurality of targets, while the corresponding video frames in the left-view and right-view videos are matched to extract corresponding feature points for stereo measurement. For example, taking the license plate of the white vehicle in FIG. 9(a) as a tracking target, the license plate in the second image is matched by the SURF feature extraction and matching algorithm, so as to accurately locate the position of the same license plate, as shown in the dotted box in FIG. 9(b).

However, the matching results are not 100% accurate whether the feature point extraction algorithm is SIFT, SURF or others. If the image is not clear enough or has a region different from the matching template, mismatching point will be generated. The correctness of vehicle tracking and the result of stereo measurement will be greatly influenced by the mismatching point. Therefore, the mismatching point needs to be eliminated for the matching result.

The homography matrix is utilized to describe the relationship between two images of the same object taken in different views. Assuming that the relationship of the two images is perspective transformation, the homography matrix, namely the perspective transformation matrix H is:

$$H = \begin{bmatrix} h_{11} & h_{12} & h_{13} \\ h_{21} & h_{22} & h_{23} \\ h_{31} & h_{32} & 1 \end{bmatrix}; \quad (8)$$

then $$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix} \quad (9)$$

wherein, x¢, y¢, 1 and x, y, 1 respectively represent the coordinates of the two corresponding points before and after the perspective transformation, and $h_{11\text{-}32}$ are transformation parameters to be calculated.

To calculate the eight transformation parameters $h_{11\text{-}32}$ in the homography matrix H, at least four pairs of matching points are needed. The process is as follows:

$$\begin{bmatrix} x_1, y_1, 1, 0, 0, 0, -x'_1 x_1, -x'_1 y_1 \\ 0, 0, 0, x_1, y_1, 1, -y'_1 x_1, -y'_1 y_1 \\ x_2, y_2, 1, 0, 0, 0, -x'_2 x_2, -x'_2 y_2 \\ 0, 0, 0, x_2, y_2, 1, -y'_2 x_2, -y'_2 y_2 \\ x_3, y_3, 1, 0, 0, 0, -x'_3 x_3, -x'_3 y_3 \\ 0, 0, 0, x_3, y_3, 1, -y'_3 x_3, -y'_3 y_3 \\ x_4, y_4, 1, 0, 0, 0, -x'_4 x_4, -x'_4 y_4 \\ 0, 0, 0, x_4, y_4, 1, -y'_4 x_4, -y'_4 y_4 \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x'_1 \\ y'_1 \\ x'_2 \\ y'_2 \\ x'_3 \\ y'_3 \\ x'_4 \\ y'_4 \end{bmatrix} \quad (10)$$

Figure 9:
FIG. 9 is a license plate tracking effect diagram in the monocular video, wherein (a) is a previous frame, (b) is a matching result of a white car's license plate between the previous frame and the current frame, and (c) is a matching effect after (b) is filtered with a homography matrix.
Figure 9:

Each time, four pairs of matching points are selected from all the matching points to calculate the homography matrix H. Then the homography matrix H with the maximum number of inner points (namely the accurate matching point) is selected as the correct result. In order to check the accuracy of the homography matrix H, the method for calculating the Euclidean distance between the corresponding matching points after the perspective transformation is as follows:

$$\left\| \begin{bmatrix} x'_{i1} \\ y'_{i1} \\ 1 \end{bmatrix} - H \begin{bmatrix} x_{i1} \\ y_{i1} \\ 1 \end{bmatrix} \right\| \leq t \tag{11}$$

wherein, $x_{i1}'$, $x_{i1}'$, 1 and $x_{i1}$, $y_{i1}$, 1 respectively represent the coordinates of the matching points before and after the transformation, t is the Euclidean distance threshold, and i1=1,2,3,4. The smaller the distance, the higher the matching accuracy of the two matching points. As shown in FIG. 9(c), the matching points are extracted with the SURF feature extraction and matching algorithm, and the correct matching points are reserved after being filtered by the homography matrix.

Next, feature point extraction and stereo matching is performed on the license plates in the corresponding video frames of the left-view and right-view cameras with the SURF feature extraction and matching algorithm. The correct results, namely the matching points, are reserved after being filtered by the homography matrix. Meanwhile, in order to reduce calculation cost, feature point extraction is performed only on the license plate region recognized in step 3. After being further screened, the reserved feature point is treated as the current position of the vehicle to perform stereo measurement.

Step 5: further screening the reserved matching point pairs in step 4, then eliminating the screened matching points with the distance measurement method of the binocular stereo vision system, and reserving the one closest to the license plate center as the position of the target vehicle in the current frame.

Figure 10:
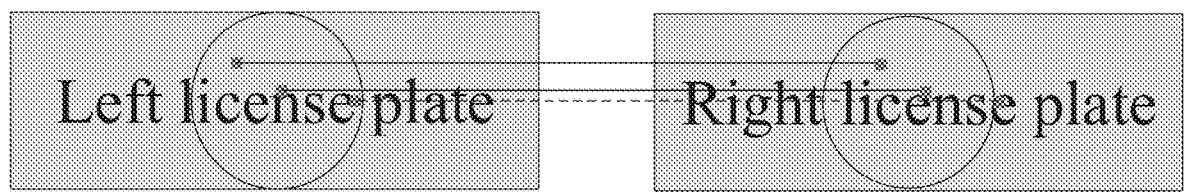
FIG. 10 is a schematic view on how the matching point is further screened.

In order to improve matching accuracy and reduce calculation cost, the reserved matching points are further screened. In the left-view video frame, a circular region is drawn in the license plate area by taking the center point of the area as the circle center and the height of the area as the diameter. In the other corresponding video frame, an isometric circular region is drawn by taking the center point of the matching area as the circle center. The matching points not simultaneously contained in the two circular regions are eliminated. As shown in FIG. 10, the two pairs of matching points connected with solid lines are respectively in the ranges of the circular regions and are correctly matched, and are thus reserved. The matching points connected with dotted lines are in the right license plate but not in the corresponding circular regions, and are thus eliminated. Finally, the matching point connected with the solid line which is closest to the center point of the license plate is selected as the target position.

After eliminating the feature points not in the target range, a stereo measurement calculation error due to inaccurate matching in the image feature point extraction and matching process is further eliminated. The binocular stereo vision system is utilized to measure distance. The distance $d_i$, the mean value $\mu$ and the standard deviation $\sigma$ of all the N matching positions are respectively calculated, and the Z score $Z_i$ for each matching point is calculated:

$$\mu = \frac{\sum_{i=1}^{N} d_i}{N} \tag{12}$$

$$\sigma = \sqrt{\frac{1}{N} \sum_{i=1}^{N} (d_i - \mu)^2} \tag{13}$$

$$Z_i = \frac{(d_i - \mu)}{\sigma} \tag{14}$$

The m1 points (namely the mismatching points) with the absolute value of $Z_i$ greater than 1 are eliminated. In the remaining N−m1 points, the point i closest to the center of the license plate is treated as the position Pi of the target vehicle in the current frame.

Step 6: performing stereo measurement on the screened matching points by the binocular stereo vision system to get the spatial position coordinates of the vehicle in each frame; and obtaining a moving trajectory of the vehicle in time sequence.

Assuming that the positions of the vehicle are $P_1=(x_1, y_1, z_1)$, $P_2=(x_2, y_2, z_2)$, and $P_3=(x_3, y_3, z_3)$ at the time $t_1$, $t_2$, and $t_3$, the 3D moving trajectory of the vehicle can be obtained in time sequence. Then, the moving direction vector of the vehicle between two points can be calculated according to the difference between the coordinates of the two points:

$$\alpha 1 = ((x_2-x_1),(y_2-y_1),(z_2-z_1))$$

$$\beta 1 ((x_3-x_2),(y_3-y_2),(z_3-z_2)) \tag{15}$$

Figure 11:
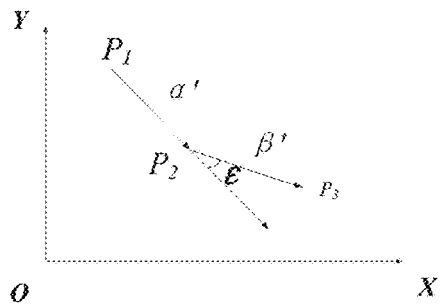
FIG. 11 is a schematic view on how to project a vehicle trajectory onto an XOY plane.

In order to facilitate the observation and calculation of the steering of the vehicle on a horizontal plane, the 3D moving trajectory of the vehicle is projected to an XOY plane, that is, the vertical coordinate is removed. As shown in FIG. 11, $\alpha'$ and $\beta'$ respectively represent projections on the XOY plane of direction vectors from a first point to a second point and from the second point to a third point. It can be derived from the vector relationship:

$$x_1 \cdot y_2 - x_2 \cdot y_1 = \sqrt{x_1^2 + y_1^2} \cdot \sqrt{x_2^2 + y_2^2} * \sin\varepsilon 1 \tag{16}$$

$$\varepsilon 1 = \arcsin \frac{x_1 g y_2 - x_2 g y_1}{\sqrt{x_1^2 + y_1^2} g \sqrt{x_2^2 + y_2^2}} \tag{17}$$

wherein, $\varepsilon 1$ is the steering angle of the vehicle. $\varepsilon 1 = 0$ indicates that the vehicle does not turn. $\varepsilon 1 > 0$ indicates that the vehicle turns left. And $\varepsilon 1 < 0$ indicates that the vehicle turns right.

Experiment:

In field experiments, three vehicle moving conditions are designed to verify the effectiveness of the present invention, i.e., straight line motion, curved motion, and multiple vehicles simultaneously passing a measurement region. Four groups of experiments are performed: 1, a vehicle travels from far to near along a straight line at a uniform speed; 2, a vehicle travels from far to near along a curve at a uniform speed; 3, two vehicles travel from the opposite directions at a uniform speed; 4, two vehicles travel from the same direction at a uniform speed. The vehicle is driven by referencing the speed meter thereof. At the same time, a trajectory measurement result of a P-Gear P-510 satellite velocimeter is taken as a ground truth of the vehicle trajectory for comparison. The velocimeter measures the speed with the data from a GPS+GLONASS double-satellite positioning system, communicates with a mobile phone via a bluetooth 4.0 chip, and ensures the measurement precision by 10 HZ high frequency GPS data exchange. The measurement error thereof is 2%. The real time data is displayed by a mobile phone application, and the moving trajectories measured each time are recorded.

First Group of Experiment:

The vehicle travels along a straight line at a uniform speed. The binocular stereo vision system is installed on the right side of the lane, keeping a 20° angle with the lane. During recording, the vehicle travels along a straight line, and the position and angle of the shooting device remain unchanged. The resolution of the recorded video is 1288×964, and the frame rate is 30f/s. The license plates are detected in the two-view videos.

Figure 12:
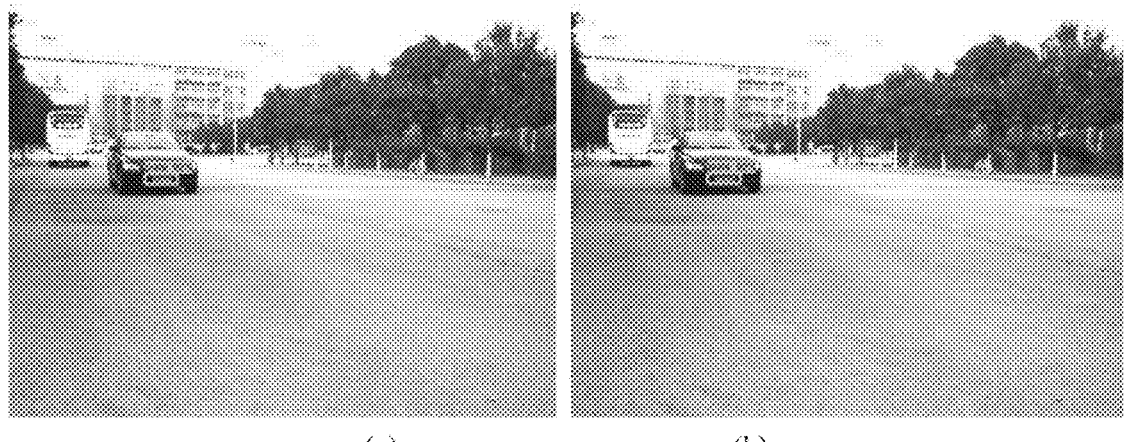
FIG. 12 is an SSD-extracted license plate target of a 3D target vehicle located at 15 m in a first experiment, wherein (a) is a left-view video frame, and (b) is a right-view video frame.
Figure 13:
FIG. 13 is an SSD-extracted license plate target of a 3D target vehicle located at 1 m the first experiment, wherein (a) is a left-view video frame, and (b) is a right-view video frame.
Figure 14:
FIG. 14 is a schematic view of a license plate matching result between the left-view and right-view video frames in the first experiment, wherein (a) is a left-view video image, and (b) is a right-view video image.

As shown in FIG. 12, when the target vehicle is 15 m away, the license plate is small. As shown in FIG. 13, when the vehicle is 1 m away, the license plate is obscure because the vehicle is very fast. However, the SSD neural network completes license plate detection and locating well in both situations. It is proved by experiment that the binocular stereo vision system can 100% realize license plate detection in the range of 1-15 m. Therefore, vehicle trajectory measurement is performed mainly in this range in the subsequent groups of experiment. Next, the license plates in the frames acquired by the left-view camera are respectively matched, and the license plates in corresponding left-view and right-view frames are matched, so as to extract matching points. FIG. 14 is a schematic view of the matching between the license plate regions in the corresponding left-view and right-view video frames, wherein (a) is a left-view video frame and (b) is a right-view video frame. After screening the matching points with the method in step 5, the steering state of the vehicle is calculated by taking every three frames as a time node, that is, measurement is performed 10 times every second; and a steering result is shown in table 1.

TABLE 1

| steering angle measurement results of uniform linear experiments | | | | | |
|---|---|---|---|---|---|
| No. | 1 | 2 | 3 | 4 | 5 |
| Angle | −0.43 | 1.16 | −1.24 | 1.15 | −1.04 |
| No. | 6 | 7 | 8 | 9 | 10 |
| Angle | 1.75 | 0.44 | −0.89 | −0.89 | −0.62 |

Figure 15:
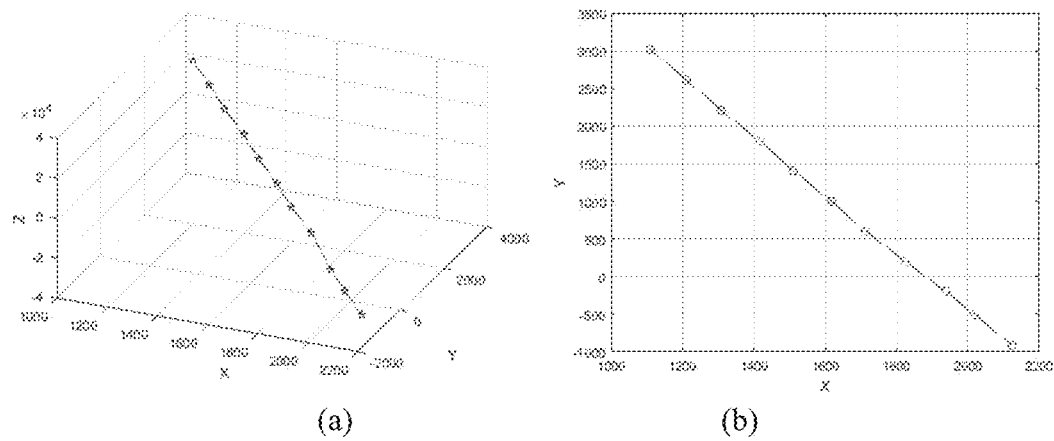
FIG. 15 is a vehicle moving trajectory in the first experiment, wherein (a) is a 3D vehicle trajectory in the first experiment, and (b) is a 2D projection of the 3D trajectory onto an XOY plane.

FIG. 15(*a*) is a 3D reconstruction of the vehicle moving trajectory, and FIG. 15(*b*) is a projection of the trajectory on the XOY plane. It can be seen from the two figures that the vehicle drives along a straight line during the measurement. However, as can be seen from table 1, during practical driving, the vehicle slightly steers because the road surface is not flat. The measured maximum steering angle is only 1.75 degrees, and the vehicle drives along a straight line as a whole. As can be seen from the above experiment, the present invention has a good trajectory measurement capability when the vehicle drives along a straight line at a uniform speed.

Figure 16:
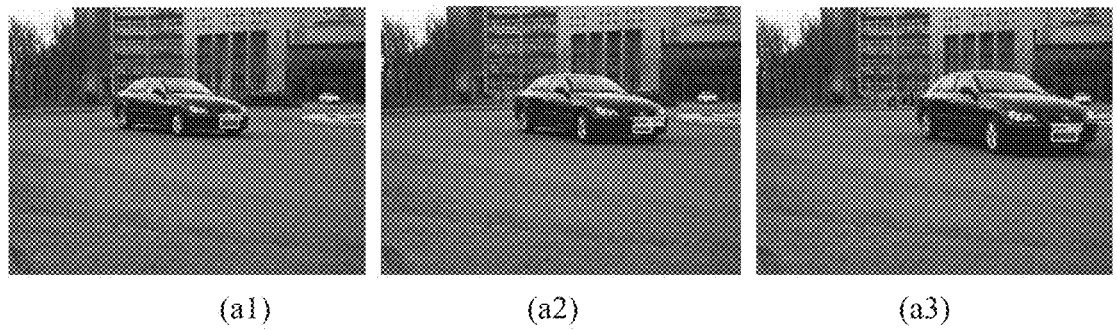
FIG. 16 is a license plate detection result and the corresponding screenshots (one frame is selected every three frames) of the left-view and right-view videos in a second steering experiment, wherein (a1) is a left-view video frame 1, (a2) is a left-view video frame 2, (a3) is a left-view video frame 3, (b1) is a right-view video frame 1, (b2) is a right-view video frame 2, and (b3) is a right-view video frame 3.
Figure 17:
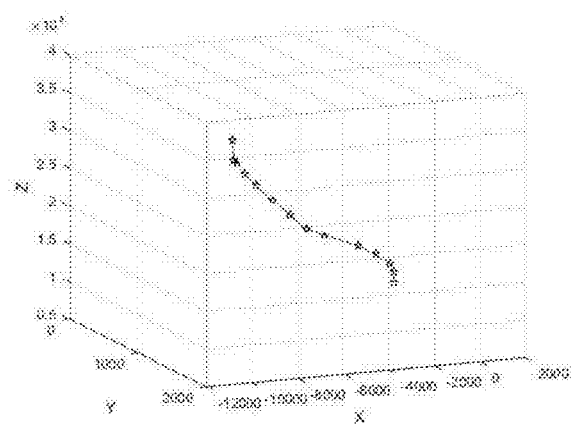
FIG. 17 is a vehicle trajectory in the second steering experiment, wherein (a) is a 3D vehicle trajectory, and (b) is a 2D projection of the 3D trajectory onto an XOY plane.
Figure 17:
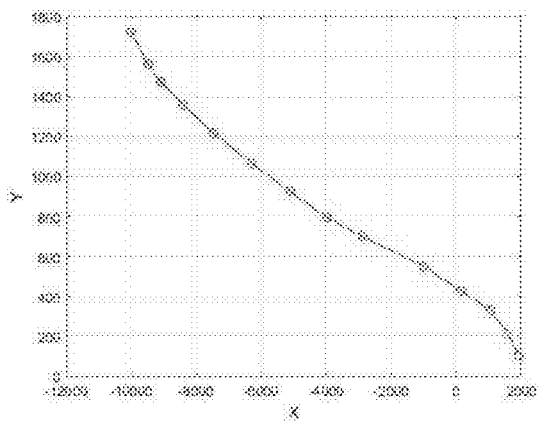

Second Group of Experiment:

By taking the speed meter of the vehicle as a reference, the vehicle gradually accelerates to 30 km/h from a stop state, and then keeps driving at this uniform speed. The cameras start recording when the vehicle reaches a start position (which is 20 m away from the binocular stereo vision system). At the same time, the vehicle anticlockwise passes round a roundabout. The vehicle turns left when starting, then drives ahead, and finally turns right. In the experiment, the binocular stereo vision system starts recording when the vehicle starts driving, until the vehicle leaves the recording region. The binocular stereo vision system is installed on the right side of the lane at a south side outlet of the roundabout, facing north by east direction, so that the visual field thereof covers the west section of the roundabout. During recording, the position and angle of the device remain unchanged. Some recorded pictures and the detection results are as shown in FIG. 16. One frame is taken every three frames. After the license plate detection and the feature points extraction and matching, the trajectory chart is drawn, as shown in FIG. 17.

Figure 18:
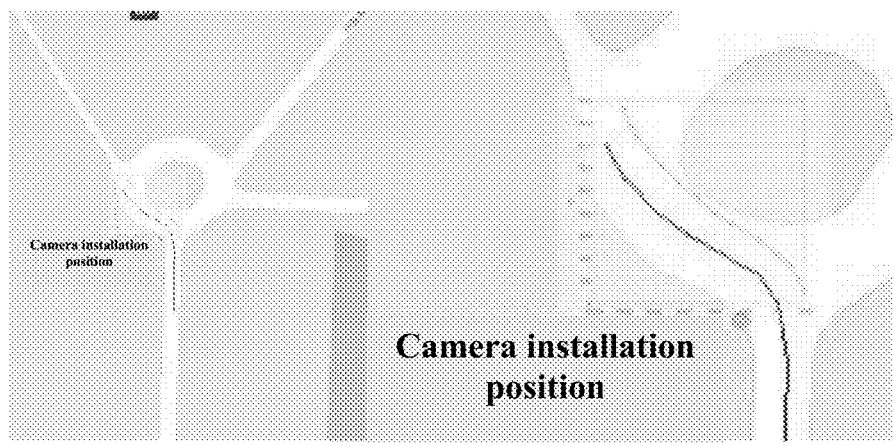
FIG. 18 is a comparison between a trajectory measured by the present invention and a GPS trajectory, wherein (a) is the trajectory measured by the system of the present invention, and (b) is the comparison between the trajectory measured by the present invention and the GPS trajectory.

The moving trajectory of the vehicle is measured after detecting the license plate and extracting and matching the feature points. FIG. 18(*a*) is a moving trajectory diagram of the vehicle recorded by the satellite velocimeter, wherein the up direction is north, the line represents the moving trajectory of the vehicle, and the point represents the camera installation position. The upper point of the line is the start point, and the lower point is the end point. The line in the south of the camera installation position already exceeds the recording range of the device. The pentagram represents the 3D spatial position in the center point of the license plate in the current frame, wherein the point at the upper left corner is the start point, and the point at the lower right corner is the end point. It can be seen from FIG. 18(*b*) that the moving trajectory of the vehicle is consistent with the trajectory recorded by the satellite.

TABLE 2

| Steering angle measurement result | | | | | | |
|---|---|---|---|---|---|---|
| No. | 1 | 2 | 3 | 4 | 5 | 6 |
| Angle | 4.301 | 2.937 | 0.881 | 1.285 | 0.567 | 0.201 |
| No. | 7 | 8 | 9 | 10 | 11 | 12 |
| Angle | 1.574 | 0.525 | −1.581 | −0.239 | −6.405 | −5.099 |

Table 2 is the steering angle measurement results. $\varepsilon=0$ indicates that the vehicle does not turn, $\varepsilon>0$ indicates that the vehicle turns left; and $\varepsilon<0$ indicates that the vehicle turns right. As can be seen from FIG. 18 and Table 2, the vehicle first turns left by 4.2°, then continuously turns left with a decreasing angle until the vehicle drives straight forward. Subsequently, the vehicle turns right with a maximum turning angle of 6.2°, and continuously turns right until the vehicle leaves the recording range. Compared with the trajectory recorded by the satellite, the present invention has a stable and reliable steering measurement effect.

Figure 19:
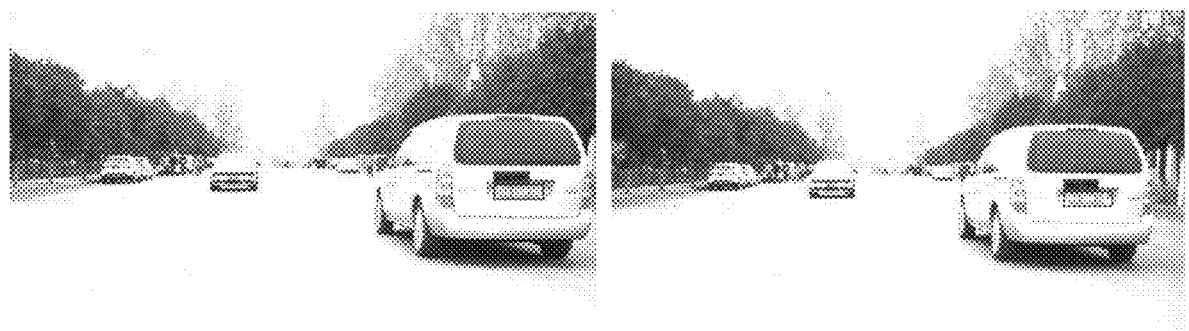
FIG. 19 is a license plate detection result and the screenshots of a video recorded in a speed measurement experiment of two oppositely driving vehicles, wherein (a) is a left-view video frame 1, (b) is a right-view video frame 1, (c) is a left-view video frame 2, and (d) is a right-view video frame 2.
Figure 19:
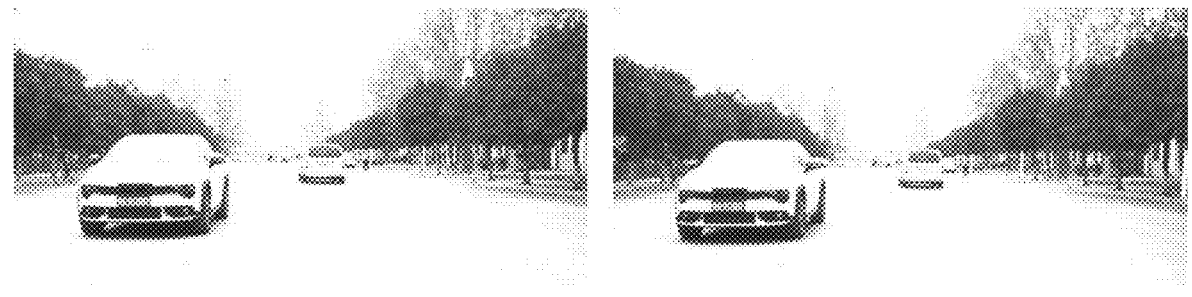
Figure 20:
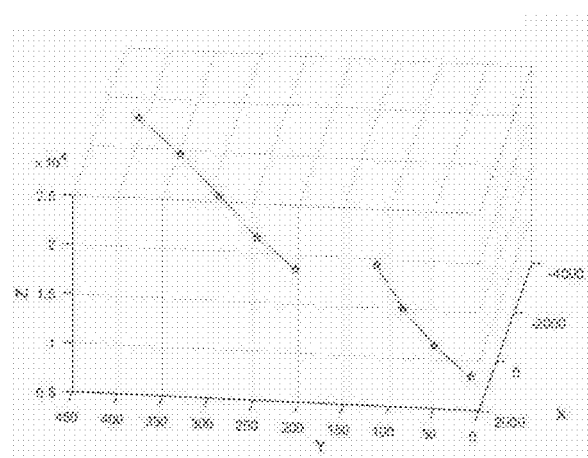
FIG. 20 is a diagram of the measured trajectories of two oppositely driving vehicles, wherein (a) are the 3D trajectories of the two vehicles, and (b) are the projection trajectories of the two vehicles onto the XOY plane.
Figure 20:
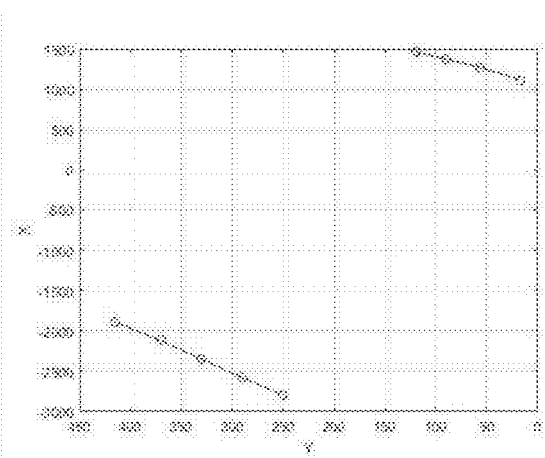

Third Group of Experiment:

Two vehicles drive in opposite directions. The binocular stereo vision system is installed in the middle of two lanes; the left vehicle drives from far to near, and the right vehicle drives from near to far. Taking the speed meters of the vehicles as reference, the two vehicles respectively drive along a straight line at a maximum speed 30 km/h, as shown in FIG. 19. A satellite velocimeter is respectively installed on each vehicle, and the result thereof is used for comparison. Then, the moving trajectories of the vehicles are reconstructed, and the results are as shown in FIG. 20. As can be seen from FIG. 20, the two vehicles drive in opposite directions basically along parallel straight lines, complying with the route situation in the experiment design.

It can be verified from the above experiments that the binocular stereo vision system has good stability and reliability in practical vehicle trajectory measurement. Compared with the conventional trajectory measurement methods, the binocular stereo vision system has high intelligence and strong extension capability. It can independently complete the functions of video acquisition, vehicle recognition, trajectory detection and the like without the assistance of other devices. The binocular stereo vision measurement technology belongs to passive measurement, that is, the binocular stereo vision system does not actively radiate any signal or ray, which is safer, with low power consumption, with no influence on people health, and with no interference to other electronic device. The binocular stereo vision system has no limitation on installation angle. It does not need to be perpendicular to or parallel with the moving direction of the target object. It is easy to install and adjust, and can simultaneously measure multiple target vehicles in multiple directions and on multiple lanes.

The descriptions above are only preferred embodiments of the present invention, but are not intended to limit the present invention. Any modifications, equivalent substitutions, improvement and the like made within the spirit and principles of the present invention are all intended to be concluded in the protection scope of the present invention.

What is claimed is:

1. A method for intelligently measuring vehicle trajectory based on a binocular stereo vision system, comprising:

step 1, inputting a dataset of images containing license plates into a SSD neural network, and training the SSD neural network with license plate as a detection feature to obtain a license plate recognition model;

step 2, installing the binocular stereo vision system on the right side, middle or above a lane, calibrating the binocular stereo vision system to acquire internal and external parameters of two cameras; and recording videos of moving target vehicles by the calibrated binocular stereo vision system;

step 3, detecting license plates in video frames recorded in step 2 with the license plate recognition model trained in step 1, and locating license plate positions of target vehicles;

step 4, performing feature point extraction and stereo matching on license plates in subsequent frames of a same camera by a feature-based matching algorithm, and reserving correct matching points after filtering with a homography matrix; performing feature point extraction and stereo matching on license plates in corresponding left-view and right-view video frames of the binocular stereo vision system by a feature-based matching algorithm, and reserving correct matching points after filtering with a homography matrix;

step 5, screening the reserved matching points in step 4 by a distance measurement method of the binocular stereo vision system, and reserving one closest to a license plate center as the position of a target vehicle in a current frame;

step 6, performing stereo measurement on the screened matching points by the binocular stereo vision system to get spatial position coordinates of vehicle in the video frames; and generating a moving trajectory of the vehicle in time sequence, wherein a calibration method for the binocular stereo vision system in the step 2 comprises: calibrating the two cameras with Zhengyou Zhang's calibration method to acquire their respective parameters such as coordinates of optical center, focal length, scale factor and/or lens distortion; after acquiring the parameters of the two cameras, calibrating the binocular stereo vision system with Zhengyou Zhang's calibration method again to acquire a displacement and rotation angle of a right-view camera relative to a left-view camera, wherein the calibration method for the binocular stereo vision system with Zhengyou Zhang's calibration method comprises: taking the left-view camera as the reference, calibrating with Zhengyou Zhang's calibration method to acquire the external parameters (relative translation vector T1=(l, m,n)$^T$ and relative rotation vector V=($\alpha,\beta,\gamma^T$)) of the right-view camera and the internal parameters (focal length, optical-axis angle, and distortion) of the two cameras themselves, wherein, l,m,n refer to displacements of the right-view camera relative to the left-view camera in three directions of x, y and z respectively, $\alpha,\beta,\gamma$ refer to the rotation angles of the right-view camera relative to the left-view camera around three axes of x, y and z respectively, wherein a convergence point of the binocular stereo vision system is determined according to the external parameters:

$$\begin{cases} B = \sqrt{l^2 + m^2 + n^2} \\ \varepsilon = \beta \end{cases},$$

wherein, B is a baseline length between the two cameras, and ε indicates the angle between the optical axes of the two cameras, wherein a transformation model is established for a target angle, and imaging points of the same space point in the two cameras are respectively called a left corresponding point and a right corresponding point, which are intersections of the left-view camera and the right-view camera's optical axes and their respective imaging planes, a' represents a difference between the left corresponding point and the convergence point in the u direction of the image coordinate system, and b' represents a difference between the right corresponding point and the convergence point in the u direction of the image coordinate system when the left corresponding point or the right corresponding point is on the left side of the convergence point, a difference value is less than 0, otherwise a difference is greater than 0, wherein the optical axes are perpendicular to their respective imaging planes, a line connecting the optical center to the target point is called corresponding axis, and angles α and b between the corresponding axes and the optical axes is calculated as:

$$\begin{cases} a = \arctan(a' / f_l) \\ b = \arctan(b' / f_r) \end{cases},$$

wherein, $f_l$ and $f_r$ indicate a focal length of the left-view camera and the right-view camera respectively, wherein when the target point is in region I, a target angle c can be calculated as $$\begin{cases} c = \varepsilon + |b| - |a| = \varepsilon - b + a \\ a < 0, b < 0 \,\&\, \varepsilon > 0 \end{cases};$$

the world coordinates of a target point P in region I are (x, y, z), and a depth calculation model for the target point P are being established as:

$$\tan a = \frac{x}{z};$$

$$\tan(c - a) = \frac{l + x}{z - n}, a < 0,$$

then $$z = \frac{n\tan(\varepsilon - b) + l}{\tan(\varepsilon - b) + \tan a},$$

wherein a world coordinate x can be calculated with the depth calculation model for the target point P as:

$$x = \frac{n\tan(\varepsilon - b) + l}{\tan(\varepsilon - b) + \tan a} \tan a,$$

wherein a world coordinate y can be calculated according to a relation between the left corresponding point and the right corresponding point in the image coordinate system and a relation between the image coordinate system and a world coordinate system, wherein the world coordinates of the target point P are:

$$\begin{cases} x = \frac{n\tan(\varepsilon - b) + l}{\tan(\varepsilon - b) + \tan a} \tan a \\ y = \frac{n\tan(\varepsilon - b) + l}{\tan(\varepsilon - b) + \tan a} \cdot \frac{v'}{f_l} \\ z = \frac{n\tan(\varepsilon - b) + l}{\tan(\varepsilon - b) + \tan a} \end{cases};$$

wherein, v' indicates the pixel difference between the target point and the image center in a longitudinal direction of the image coordinate system, and $f_l$ is the focal length of the left-view camera, similarly, world coordinates of the target point in region II, region III and region IV are calculated.

2. The method for intelligently measuring vehicle trajectory based on a binocular stereo vision system according to claim 1, wherein the SSD neural network in step 1 is formed on a basis of a classical SSD neural network by removing a convolutional layer conv11_2 and reserving convolutional layers conv4_3, cony_7, conv8_2, conv9_2 and conv10_2, wherein a feature information in different scales extracted by the convolutional layers conv4_3, conv7, conv8_2, conv9_2, and conv10_2 is fused and input into a classifier, wherein the position of the license plate is predicted according to the feature maps output by the convolutional layers.

3. The method for intelligently measuring vehicle trajectory based on a binocular stereo vision system according to claim 1, wherein a dataset in step 1 is composed of 1000 self-shot license plate images, a BIT-Vehicle dataset provided by Beijing Institute of Technology and open license plate dataset provided by OpenITS research plan sponsored by Guangdong Key Laboratory of Intelligent Transportation Systems (ITS), forming a dataset with 11,000 images.

4. The method for intelligently measuring vehicle trajectory based on a binocular stereo vision system according to claim 1, wherein the binocular stereo vision system comprises a host computer and two cameras connected to the host computer, wherein the two cameras are flea2 industrial cameras, one for the left-view camera and the other for the right-view camera.

5. The method for intelligently measuring vehicle trajectory based on a binocular stereo vision system according to claim 1, wherein the feature-based matching algorithm is a SURF feature extracting and matching algorithm, the local features of the video frames are described by the SURF descriptors, wherein the homography matrix describes the relationship between two images of the same object taken in the different views, the relationship of the two images is perspective transformation, then the homography matrix H is:

$$H = \begin{bmatrix} h_{11} & h_{12} & h_{13} \\ h_{21} & h_{22} & h_{23} \\ h_{31} & h_{32} & 1 \end{bmatrix};$$

then $$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix},$$

wherein x', y', 1 and x, y, 1 represent the coordinates of the two corresponding points before and after the perspective transformation respectively, and $h_{11\text{-}32}$ are transformation parameters to be calculated to calculate the eight transformation parameters $h_{11\text{-}32}$ in the homography matrix H, at least four pairs of matching points are needed, the process is as follows:

$$\begin{bmatrix} x_1, y_1, 1, 0, 0, 0, -x'_1 x_1, -x'_1 y_1 \\ 0, 0, 0, x_1, y_1, 1, -y'_1 x_1, -y'_1 y_1 \\ x_2, y_2, 1, 0, 0, 0, -x'_2 x_2, -x'_2 y_2 \\ 0, 0, 0, x_2, y_2, 1, -y'_2 x_2, -y'_2 y_2 \\ x_3, y_3, 1, 0, 0, 0, -x'_3 x_3, -x'_3 y_3 \\ 0, 0, 0, x_3, y_3, 1, -y'_3 x_3, -y'_3 y_3 \\ x_4, y_4, 1, 0, 0, 0, -x'_4 x_4, -x'_4 y_4 \\ 0, 0, 0, x_4, y_4, 1, -y'_4 x_4, -y'_4 y_4 \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x'_1 \\ y'_1 \\ x'_2 \\ y'_2 \\ x'_3 \\ y'_3 \\ x'_4 \\ y'_4 \end{bmatrix};$$

each time, four pairs of matching points are selected from all the matching points to calculate the homography matrix H; then the homography matrix with the maximum number of accurate matching points is selected as the most accurate homography matrix H to check the accuracy of the matrix H, the Euclidean distance between the corresponding matching points is calculated:

$$\left\| \begin{bmatrix} x'_{i1} \\ y'_{i1} \\ 1 \end{bmatrix} - H \begin{bmatrix} x_{i1} \\ y_{i1} \\ 1 \end{bmatrix} \right\| \leq t$$

wherein $x_{i1}'$, $y_{i1}'$, 1 and $x_{i1}$, $y_{i1}$, 1 are the coordinates of the matching points before and after the perspective transformation, t is the Euclidean distance threshold, and i1=1,2,3,4 wherein the smaller the Euclidean distance, the higher the matching accuracy of the two corresponding matching points.

6. The method for intelligently measuring vehicle trajectory based on a binocular stereo vision system according to claim 1, wherein the screening method in step 5 comprises the steps of: in the left-view video frame, drawing a circle in a license plate area by taking the center point of the area as the circle center and the height of the area as the diameter; in the corresponding right-view video frame, drawing an isometric circle by taking the center of the matching area as the circle center; and eliminating the matching points not simultaneously contained in the two circles.

7. The method for intelligently measuring vehicle trajectory based on a binocular stereo vision system according to claim 1, wherein the distance measurement method of the binocular stereo vision system in step 5 comprises the steps of: calculating the distance $d_i$ of all the N matching points respectively; calculating the mean value m and the standard deviation s of $d_i$; calculating the Z score $Z_i$ for each matching point:

$$\mu = \frac{\sum_{i=1}^{N} d_i}{N},$$

$$\sigma = \sqrt{\frac{1}{N}\sum_{i=1}^{N}(d_i - \mu)^2},$$

$$Z_i = \frac{(d_i - \mu)}{\sigma},$$

eliminating m1 matching points with the absolute values of Z score $|Z_i|>1$; choosing the matching point i closest to the center of the license plate from the remaining N-m1 matching points; and taking its coordinates as the position $P_i$ of the target vehicle in the current frame.

8. The method for intelligently measuring vehicle trajectory based on a binocular stereo vision system according to claim 6, wherein in step 6, stereo measurement is performed on the screened matching points by the binocular stereo vision system to get the positions $P_1=(x_1,y_1,z_1)$, $P_2=(x_2,y_2,z_2)$, $P_3=(x_3,y_3,z_3)$ of the target vehicle at the time $t_1$, $t_2$, $t_3$, and so on; the moving trajectory and steering information of the vehicle can be obtained in time sequence, the moving direction vector of the vehicle between two points can be calculated according to the difference between the coordinates of the two points:

$$\alpha 1=((x_2-x_1),(y_2-y_1),(z_2-z_1)),$$

$$\beta_1=((x_3-x_2),(y_3-y_2),(z_3z_2))$$

wherein the 3D moving trajectory of the vehicle is projected onto an XOY plane to obtain a vector relationship:

$$x_1 \cdot y_2 - x_2 \cdot y_1 = \sqrt{x_1^2 + y_1^2} \cdot \sqrt{x_2^2 + y_2^2} * \sin\varepsilon 1,$$

$$\varepsilon 1 = \arcsin\frac{x_1 g y_2 - x_2 g y_1}{\sqrt{x_1^2 + y_1^2} g \sqrt{x_2^2 + y_2^2}},$$

wherein $\varepsilon_1$ is the steering angle of the vehicle; $\varepsilon_1=0$ indicates that the vehicle does not turn; $\varepsilon_1>0$ indicates that the vehicle turns left; and $\varepsilon_1<0$ indicates that the vehicle turns right.

9. The method for intelligently measuring vehicle trajectory based on a binocular stereo vision system according to claim 2, wherein a dataset in step 1 is composed of 1000 self-shot license plate images, a BIT-Vehicle dataset provided by Beijing Institute of Technology and open license plate dataset provided by OpenITS research plan sponsored by Guangdong Key Laboratory of Intelligent Transportation Systems (ITS), forming a dataset with 11,000 images.

10. The method for intelligently measuring vehicle trajectory based on a binocular stereo vision system according to claim 5, wherein the screening method in step 5 comprises the steps of: in the left-view video frame, drawing a circle in a license plate area by taking the center point of the area as the circle center and the height of the area as the diameter; in the corresponding right-view video frame, drawing an isometric circle by taking the center of the matching area as the circle center; and eliminating the matching points not simultaneously contained in the two circles.

11. The method for intelligently measuring vehicle trajectory based on a binocular stereo vision system according to claim 5, wherein the distance measurement method of the binocular stereo vision system in step 5 comprises the steps of: calculating the distance $d_i$ of all the N matching points respectively; calculating the mean value m and the standard deviation s of $d_i$; calculating the Z score $Z_i$ for each matching point:

$$\mu = \frac{\sum_{i=1}^{N} d_i}{N},$$

$$\sigma = \sqrt{\frac{1}{N}\sum_{i=1}^{N}(d_i - \mu)^2},$$

$$Z_i = \frac{(d_i - \mu)}{\sigma},$$

eliminating m1 matching points with the absolute values of Z score $|Z_i|>1$; choosing the matching point i closest to the center of the license plate from the remaining N-m1 matching points; and taking its coordinates as the position $P_i$ of the target vehicle in the current frame.

12. The method for intelligently measuring vehicle trajectory based on a binocular stereo vision system according to claim 10, wherein in step 6, stereo measurement is performed on the screened matching points by the binocular stereo vision system to get the positions $P_1=(x_1,y_1,z_1)$, $P_2=(x_2,y_2,z_2)$, $P_3=(x_3,y_3,z_3)$ of the target vehicle at the time $t_1$, $t_2$, $t_3$, and so on; the moving trajectory and steering information of the vehicle can be obtained in time sequence, the moving direction vector of the vehicle between two points can be calculated according to the difference between the coordinates of the two points:

$$\alpha 1=((x_2-x_1),(y_2-y_1),(z_2-z_1)),$$

$$\beta_1=((x_3-x_2),(y_3-y_2),(z_3z_2))$$

wherein the 3D moving trajectory of the vehicle is projected onto an XOY plane to obtain a vector relationship:

$$x_1 \cdot y_2 - x_2 \cdot y_1 = \sqrt{x_1^2 + y_1^2} \cdot \sqrt{x_2^2 + y_2^2} * \sin\varepsilon 1,$$

$$\varepsilon 1 = \arcsin\frac{x_1 g y_2 - x_2 g y_1}{\sqrt{x_1^2 + y_1^2} g \sqrt{x_2^2 + y_2^2}},$$

wherein $\varepsilon_1$ is the steering angle of the vehicle; $\varepsilon_1=0$ indicates that the vehicle does not turn; $\varepsilon_1>0$ indicates that the vehicle turns left; and $\varepsilon_1<0$ indicates that the vehicle turns right.

* * * * *